United States Patent
Friedman (10) Patent No.: US 10,380,680 B2
(45) Date of Patent: Aug. 13, 2019

(54) SELLER DASHBOARD AND RESERVE PRICE LOWERING

(71) Applicant: Ten-X, LLC, Irvine, CA (US)

(72) Inventor: Robert Friedman, Laguna Hills, CA (US)

(73) Assignee: Auction.com, LLC, Irvine, CA (US)

(*) Notice: Subject to any disclaimer, the term of this patent is extended or adjusted under 35 U.S.C. 154(b) by 0 days.

(21) Appl. No.: 14/213,386

(22) Filed: Mar. 14, 2014

(65) Prior Publication Data

US 2014/0279153 A1    Sep. 18, 2014

Related U.S. Application Data (60) Provisional application No. 61/852,062, filed on Mar. 15, 2013, provisional application No. 61/852,469, filed on Mar. 15, 2013.

(51) Int. Cl.
*G06Q 30/00* (2012.01)
*G06Q 30/08* (2012.01)
*G06Q 30/06* (2012.01)

(52) U.S. Cl.
CPC ......... *G06Q 30/08* (2013.01); *G06Q 30/0601* (2013.01); *G06Q 30/0631* (2013.01); *G06Q 30/0633* (2013.01); *G06Q 30/0643* (2013.01)

(58) Field of Classification Search
CPC ................. G06Q 30/08; G06Q 30/0601–0645
USPC .............................................. 705/26.1–27.2
See application file for complete search history.

(56) References Cited

U.S. PATENT DOCUMENTS

| | | | |
|---|---|---|---|
| 6,871,190 B1 * | 3/2005 | Seymour | G06Q 40/04 705/26.3 |
| 2002/0103740 A1 | 8/2002 | Maroney | |
| 2003/0055773 A1 * | 3/2003 | Guler et al. | 705/37 |
| 2003/0126061 A1 * | 7/2003 | Brett | G06Q 40/04 705/37 |
| 2005/0234798 A1 | 10/2005 | Du Preez | |
| 2010/0217680 A1 * | 8/2010 | Fusz | G06Q 30/0283 705/26.1 |
| 2010/0256999 A1 * | 10/2010 | Ghani | G06Q 30/0202 705/4 |
| 2011/0093317 A1 | 4/2011 | Chan | |
| 2011/0173086 A1 * | 7/2011 | Berkowitz | 705/26.3 |

(Continued)

OTHER PUBLICATIONS

Walsh et al., Computing Reserve Prices and Identifying the Value Distribution in Real-world Auctions with Market Disruptions, Proceedings of the Twenty-Third AAAI Conference on Artificial Intelligence (2008) (Year: 2008).*

(Continued)

*Primary Examiner* — Resha Desai
*Assistant Examiner* — Lindsey B Smith
(74) *Attorney, Agent, or Firm* — Fish IP Law, LLP (57) ABSTRACT

A method and system for a seller auction dashboard and reserve price lowering are described. The system generates a dashboard presentation that displays real-time information about each of a seller's auctions including a current price, reserve price, and an indicator of whether the latest bid was set by a prospective buyer or the seller masquerading as a buyer. The dashboard also indicates which auctions are below their reserve prices and displays reserve price suggestions and success probabilities based on qualitative and quantitative metrics.

12 Claims, 6 Drawing Sheets

(56) References Cited

U.S. PATENT DOCUMENTS

2012/0239582 A1  9/2012  Solari et al.
2013/0054404 A1  2/2013  Garcia
2013/0138490 A1  5/2013  Mosley
2014/0172672 A1  6/2014  Moore

OTHER PUBLICATIONS

International Search Report and Written Opinion dated Sep. 30, 2014, Application No. PCT/US2014/028872, 10 Pages.
International Preliminary Report on Patentability dated Mar. 15, 2013, Application No. PCT/US2014/028872, 7 Pages.
Extended European Search Report dated Aug. 19, 2016, Application No. 14762872.1, 5 pages.
Communication pursuant to Article 94(3) EPC dated Jul. 5, 2017, Application No. 14762872.1, 5 pages.

* cited by examiner

| Asset Identifier | Current Bid Price | Bids | Create Bid | Reserve Price | Suggested Reserve Prices | Probabilities | End |
|---|---|---|---|---|---|---|---|
| Home A | $255,000 | 2 (Promo) | Click Here | $310,000 | $300,000<br>$265,000 | 31%<br>92% | Jan. 9<br>6:15PM |
| Home B | $200,000 | 1 (Real) | Click Here | $300,000 | $275,000<br>$250,000 | 20%<br>60% | Jan. 21<br>5:45PM |

SELLER DASHBOARD AND RESERVE PRICE LOWERING

RELATED APPLICATIONS

This application claims benefit of priority to Provisional U.S. Patent Application No. 61/852,469, filed Mar. 15, 2013; and to Provisional U.S. Patent Application No. 61/852,062, filed Mar. 15, 2013; both of the aforementioned priority applications being hereby incorporated by reference in their respective entirety for all purposes.

TECHNICAL FIELD

Examples described herein relate to online markets, and more specifically, to a system and method for using automatic bidding to promote lower reserve prices in active auctions.

BACKGROUND

Numerous online auction forums exist that enable consumers and sellers to transact for various kinds of items, such as collectibles, electronics and other goods or services.

DETAILED DESCRIPTION

Examples described herein include an online auction forum that promotes an event sequence in which a seller is prompted to lower a reserve price, in combination with an alias bid made on behalf of the seller. The event sequence is used to promote a genuine bid that surpasses the lowered reserve.

According to some embodiments, an online auction forum is hosted in which bids originating from an auction host or seller are combined with the lowering of a reserve price in order to promote bidding activity for an item being auctioned. By creating this sequence of auction activity, auctions with little or no activity may be seen as more attractive to prospective bidders, increasing the likelihood of a successful sale. Similarly, lowering the reserve price reduces the size of a bid required to win the auction, thereby also increasing the likelihood of the auction's success.

In an example, for each concurrent online auction associated with a seller, an interactive presentation is generated and communicated to prospective bidders over a network. Each auction has an associated reserve price selected by the seller which remains undisclosed to the prospective bidders. While the auction has not yet reached this reserve price, the online auction system can operate to generate prompts for suggested reserve prices, which are communicated to the seller. In one example, a seller dashboard lists the new reserve price suggestions and prompts the seller for action. Furthermore, the seller may initiate programmatic or seller bids up to the new selected reserve price, and the true source of these bids is hidden so that prospective bidders are led to believe the bids were placed by other prospective bidders. In one example, the programmatic or seller bid is an amount such that the sum of the programmatic or seller bid and the auction's minimum bid increment is equal to or greater than the new reserve price, thus ensuring that the next bid by one of the prospective bidders will at least meet the new reserve price.

In an example, the auction system generates a virtual personality associated with the programmatic or seller bids who appears to prospective bidders to be a legitimate bidding account.

In an example, the seller selects the programmatic or seller bid. Alternatively, it may be programmatically generated and/or set to be made upon activation of a preset trigger chosen by the seller or the auction system. This trigger corresponds to, for example, bidding activity, a scheduled event, or an elapsed period of time.

Among other benefits, examples described herein achieve a technical effect by providing an enhanced user interface and related functionality for enabling a seller to complete an auction. An interface enables, for example, a seller to trigger a tandem action in which the reserve of the auction is lowered, while bidding activity is simulated. Still further, an interface is provided that enables a seller to manage multiple auctions by viewing reserve price, triggering tandem actions, and viewing probabilities of success at one time. The collection of such information and input functionality in one interface further achieves the technical effect of enabling sellers to make better and more informed decisions for completing an auction in progress.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, a software component, or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs.

Auction Architecture

Figure 1:
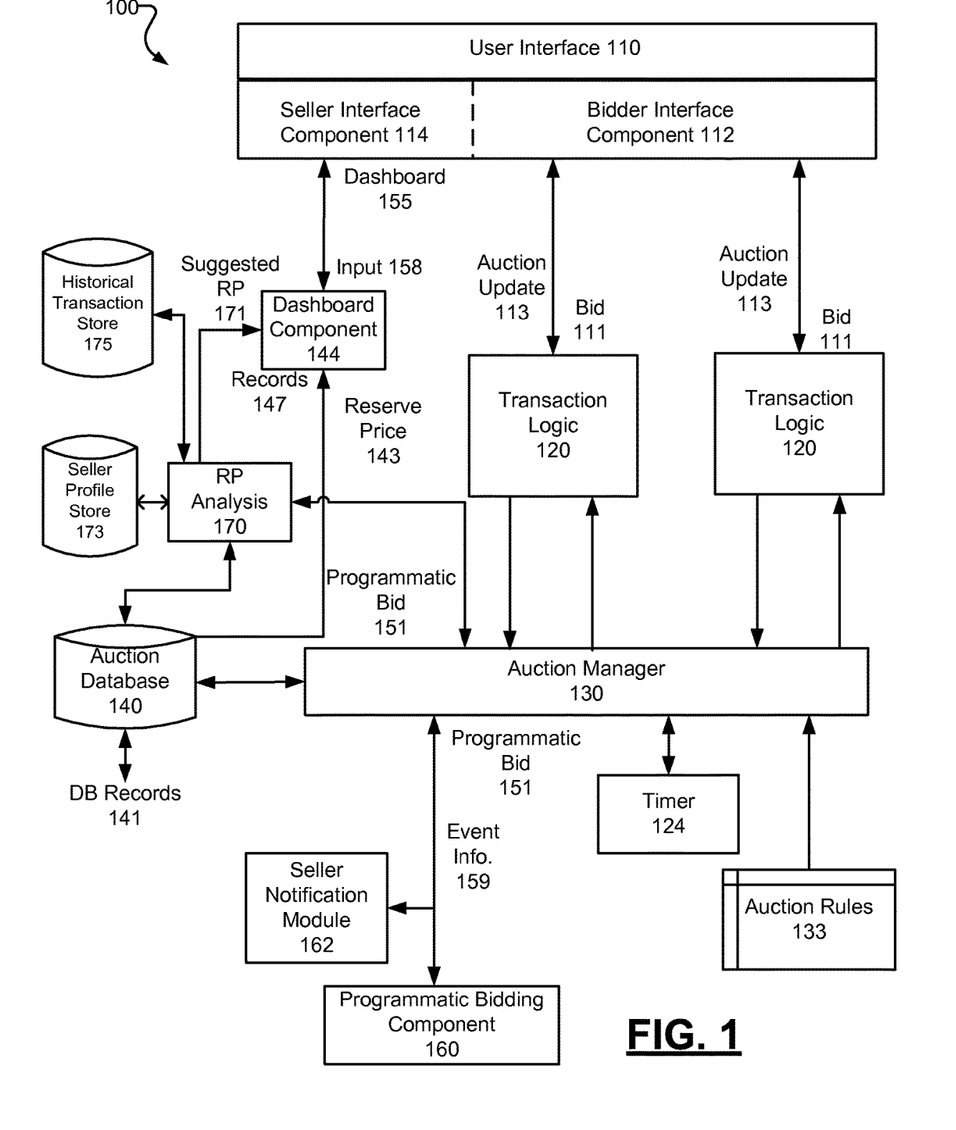
FIG. 1 is a block diagram illustrating an online auction system in which automatic bidding is used to promote lower reserve pricing, according to an example.

FIG. 1 illustrates an online auction system 100 in which programmatic or seller bidding is used to promote lower reserve pricing according to an example. The system 100 such as shown by an example of FIG. 1 can be implemented in connection with an online auction service for any type of commercial item, such as, for example, real property (e.g., homes, real-estate notes, commercial property), motor vehicles (e.g., automobiles, motorcycles, boats), consumer electronics, collectibles, clothing, or services to be performed.

In an example of FIG. 1, system 100 includes functionality that can be implemented by processes, logical components and/or modules. In an example of FIG. 1, system 100 includes a bidder interface 112, transaction logic 120, an auction manager 130, and an auction database 140. The auction database 140 can retain database records 141 that identify items that are to be auctioned and/or items which are undergoing or have completed an auction.

As shown by an example of FIG. 1, multiple instances of transaction logic 120 can be implemented at a given time in order to conduct an auction and to progress the auction towards completion. The transaction logic 120 interacts through the auction manager 130 to access auction database 140 in order to receive information from records 141 identifying items to be auctioned or currently being auctioned. The transaction logic 120 can include functionality to (i) initiate an auction, (ii) advance the auction towards completion, and (iii) end or complete the auction when certain conditions are satisfied (e.g., after completion of time and/or satisfaction of completion rules). In addition to receiving and processing bids 111, the transaction logic 120 provides an auction update 113 to the bidders that are viewing or participating in a particular auction. The auction update 113 can include information such as a current price for the item being auctioned, an amount of time remaining in the auction, and/or comments from other users. Other information that can be updated by the transaction logic 120 and published through the bidder interface 112 include identifiers for active bidders, recent bid amounts, bid increment (which represents the minimum amount a new bidder must bid over the current top bid), comments from other users, and information from other auctions that may be in various states (e.g., pre-auction versus in-progress). The auction updates 113 are published through the bidder interface 112 to the population of users.

In an example of FIG. 1, the auction manager 130 coordinates the progress of multiple auctions. In particular, the auction manager 130 triggers transaction logic 120 to initiate individual auctions so that individual auctions progress towards completion in accordance with a set of auction rules 133. In this way, the auction manager 130 provides the framework and implements a set of auction rules 133 by which the individual auctions are conducted. The auction manager 130 interfaces with the auction database 140 in order to retrieve database records 141. Each database record can identify one or multiple items for auction. In an example of FIG. 1, auction manager 130 initiates instances of transactional logic 120, and communicates auction rules 133 to the transaction logic 120 in order to progress the corresponding auctions towards completion. The auction rules 133 can also include completion rules, which specify rules or conditions that affect the timer 124 maintained by each auction. In this way, the completion rules can specify when a particular auction is to be extended based on the occurrence of a designated event. In one example, completion rules cause corresponding transaction logic 120 to extend an auction in the event an incoming bid is received in a given time frame. For example, the completion rules may specify that an auction will end at a given time, unless a bid is received in the last minute (or other duration), in which case the auction is extended. In addition, the timer 124 may be used to track triggers used by programmatic bidding component 160 such as elapsed time and scheduled events.

At a given instance, the records 141 of the auction database 140 represent any one of (i) ongoing or current auctions, (ii) prior or archived auctions, and/or (iii) future auctions. Accordingly, each of the records 141 can be associated with a seller identifier, and an item of merchandise (e.g., a parcel of land, a home, merchandise, etc.) as well as auction status. The auction status can correspond to whether the auction is live (e.g., currently ongoing), completed, or upcoming, and ongoing auctions can include a time remaining. Other status information can include the highest bid, history of bids, the identifier of each bidder, and information about a reserve price. As described by numerous examples, the reserve price can be recorded and tracked, but publication of the reserve price can be hidden. However, from auctions may include indications as to whether there is a reserve, and/or whether the reserve price has been met.

The user interface 110 can include functionality for supporting both seller and bidder activities. In particular, the user interface 110 can include a bidder interface component 112 for supporting bidder activities, and a seller interface component 114 for supporting seller activities. According to embodiments, the seller activities supported through the user interface 110 can include (i) listing an auction, including designating parameters such as reserve price; (ii) adjusting auction parameters, including the reserve price, once the auction is ongoing; and (iii) generating seller bids, subject to auction rules 133 and conditions.

Figure 3:
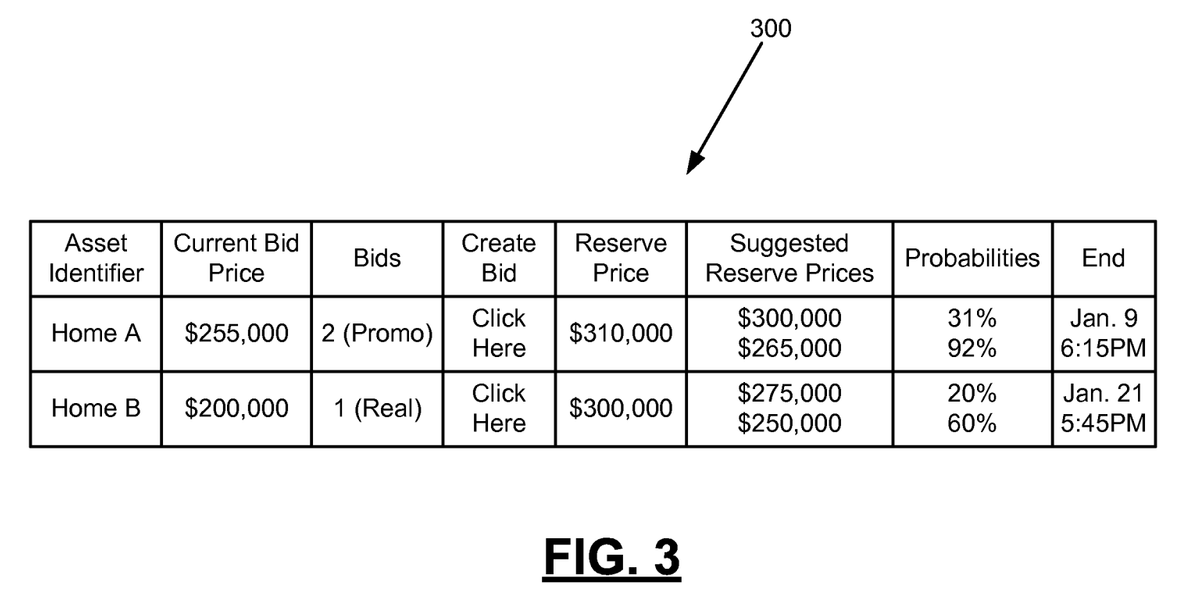
FIG. 3 illustrates a sample dashboard for displaying information about a seller's auctions, including current reserve price and suggestions for lower reserve prices.

In some implementations, the seller interface component 114 is provided with or coupled to the dashboard component 144. The dashboard component 144 uses a seller identifier to retrieve from the auction database 140 a set of records 147 which are specific to the particular seller. The dashboard component 144 can generate a dashboard 155 that displays for the seller a variety of information, including the auction identifier, the status of the auction, the highest bid receipt for the particular auction, whether the reserve price is met or not, and other information as described by examples provided herein. As described her variety of examples, the dashboard component 144 can further enable functionality through the dashboard 155 for enabling the seller to lower a reserve price for a particular auction, and also to generate one or more programmatic or seller bids, provided that the bids generated or less than the most recent reserve price specified by the seller. The seller dashboard component 144 can be implemented as, for example, a widget or an application, so as to generate the dashboard 155 as a user interface. An example of a seller dashboard 155 is shown by FIG. 3.

The bidder interface component 112 includes functionality for enabling bidders to view and participate in an in-progress auction. Accordingly, the bidder interface 112 can include functionality for enabling a bidder to specify a bid and to monitor in real-time the current value of an item being auctioned. The bidder interface 112 can be provided as, for example, a webpage that includes functional elements for enabling the users to provide input (e.g., bids) and to view real-time updates for an auction that is in progress. In variations, the bidder interface 112 can be provided as application content, such as through a display or panel of a network-enabled application executed on a computer, mobile device, or other similar hardware.

In some embodiments, system 100 enables programmatic or seller bidding when certain conditions are present in an auction in progress. Programmatic or seller bidding refers to a bid made by or on behalf of the seller under the guise of an interested bidder. In one implementation, a programmatic bidding component 160 provides functionality for generating programmatic or seller bids 151 for a given auction. Programmatic or seller bids 151 can, for example, be communicated to the auction manager 130, which in turn displays it to the participants of a given auction via the user interface 110. The programmatic or seller bids 151 can be triggered by, for example, default settings or parameters of system 100, as well as through input 158 from the seller made through, for example, the dashboard presentation 155 and/or seller interface component 114. In one example, programmatic bidding component 160 can generate an alias, and specify a bid for a given auction that is subject to auction rules 133. In particular, the auction rules 133 can specify that the programmatic or seller bid 151 can only be generated for amount that is less than the existing reserve price 143. In variations, the auction rules 133 only allow programmatic or seller bids 151 for certain types of auctions or auction settings.

In variations, programmatic bidding may be subjected to manual or triggered input from the seller. Thus, for example, the seller may manually enter bids for himself on the seller dashboard 155. In one implementation, the programmatic bidding component 160 communicates programmatic or seller bid 151 to the auction manager 130. Auction manager 130 can incorporate the programmatic or seller bid 151 into the transaction logic 120, where it may be communicated via update 113 to bidder interface 112. To prospective bidders, the programmatic or seller bid 151 appears as a genuine bid that raises the current auction price to a value that is closer to the reserve. In one example, the programmatic bidding component 160 generates a new virtual personality account associated with the programmatic or seller bid 151 or uses a previously created virtual personality account. In this way, prospective bidders believe that the programmatic or seller bid 151 was placed by another bidder. In order to generate the programmatic or seller bid 151, programmatic bidding component 160 may receive auction information, including event information 159 which identifies specific events or conditions where such programmatic bids are permitted. For example, event information 159 may indicate the most recent reserve price 143, highest bid 111, and triggers from timer 124, which can be prerequisites before the programmatic or seller bid 151 is generated. Additionally, event information 159 can indicate information about bid activity, including lack of bidding activity. For example, if no bidding activity has been received for the auction or if the time between the last genuine bid has exceeded a threshold, event information 159 can cause programmatic bidding component 160 to generate the programmatic or seller bid 151. In addition, the programmatic or seller bid 151 can be communicated to the seller such as on the seller dashboard 155 using the seller notification module 162, for example to wait on seller approval.

Some examples described herein facilitate a tandem set of operations in which the seller is prompted to lower the reserve price 143, coupled with generation of a programmatic or seller bid 151, in order to enable a next bid from one of the bidders that exceeds the new reserve price and potentially ends the auction with the transaction being completed. The tandem set of operations can be generated in response to pre-determined triggers, such as the top bid of the auction approaching some threshold range of the reserve (e.g., top bid is x bid increments from the reserve price, where x=2 or more), passage of time (e.g., auction nearing end and reserve not met), or some programmatic decision that deems the auction as not likely to succeed (e.g., highest bid will not reach reserve price). As described with some examples, the seller can alternate the reserve price for a given auction using a dashboard 155, provided through the dashboard component 144 and/or the seller interface component 114.

Still further, in some embodiments, a reserve price analysis component 170 is used to implement the tandem operation by generating a seller prompt (suggested reserve price 171) to lower the reserve price 143 to a particular amount. The seller prompt can be communicated to the seller through the seller interface component 114 and/or dashboard 155. In response, the seller can lower the reserve for the auction through, for example, seller interface component 114 and/or dashboard component 144. The particular amount suggested for the reserve price can be based on a price that will generate a next genuine bid from a bidder that will push the transaction price above the reserve price. In determining the lower suggested reserve price 171, reserve price analysis component 170 takes into consideration the current bid increment as well as the current highest bid. By way of example, if the reserve price is $100 and the highest bid is $80 with bid increments of $5, the suggested lower reserve price may be $90, followed by a programmatic or seller bid of $85 to generate bidding activity that achieves the lower reserve price.

In still another embodiment, the reserve price analysis component 170 models or anticipates a high (or highest) reserve price for a given auction that is likely to yield a genuine bid that results in the sale of the item. In one implementation, reserve price analysis component 170 monitors the bidding activity of a given auction. Additionally, the reserve price analysis component 170 works in tandem with the programmatic bidding component 160 through the auction manager 130 to process the programmatic or seller bids 151. The reserve price analysis component 170 can utilize qualitative and quantitative metrics such as bidding activity, historical information about the past transactions, and prior seller information in order to determine a model reserve price. Examples of quantitative bidding activity metrics include number of bidders, number of bids, number of registered bids, etc. Examples of qualitative historical information about the past transactions include same products, same type of products, etc. An example of qualitative seller information metrics include, seller experience level. In one embodiment, multiple reserve prices are determined with varying statistical probabilities of a successful auction. In calculating the suggested reserve price 171 and associated statistical probabilities, the reserve price analysis component 170 can interface with other databases, for example, a seller profile store 173 or a historical transaction store 175 (e.g., listing information about past transactions for a given item or type of item). The reserve price analysis component 170 can calculate the suggested reserve price 171 and/or provide probabilities for one or more suggested reserve prices by identifying comparable assets (e.g., real property of the same price range in the same geographic region, comparable real property items, etc.) and then determining the sale price for such assets. Still further, in some variations, the reserve price analysis component 170 can obtain bidding history for past transactions of comparable assets to determine how often in recent past a particular reserve price was exceeded. Still further, the reserve price analysis component 170 can obtain evaluation of an asset using, for example, a valuation service, and then estimate reserve price based on the valuation. For example, a reserve price that is 75% of an estimated valuation for a real property asset can be marked as having a high probably of success, while a reserve price that exceeds the estimated value of the asset can be marked as having a low probability of success. Many such variations such as described can be provided in order to determine probabilities for a particular reserve price, or set of reserve prices.

Methodology

Figure 2A:
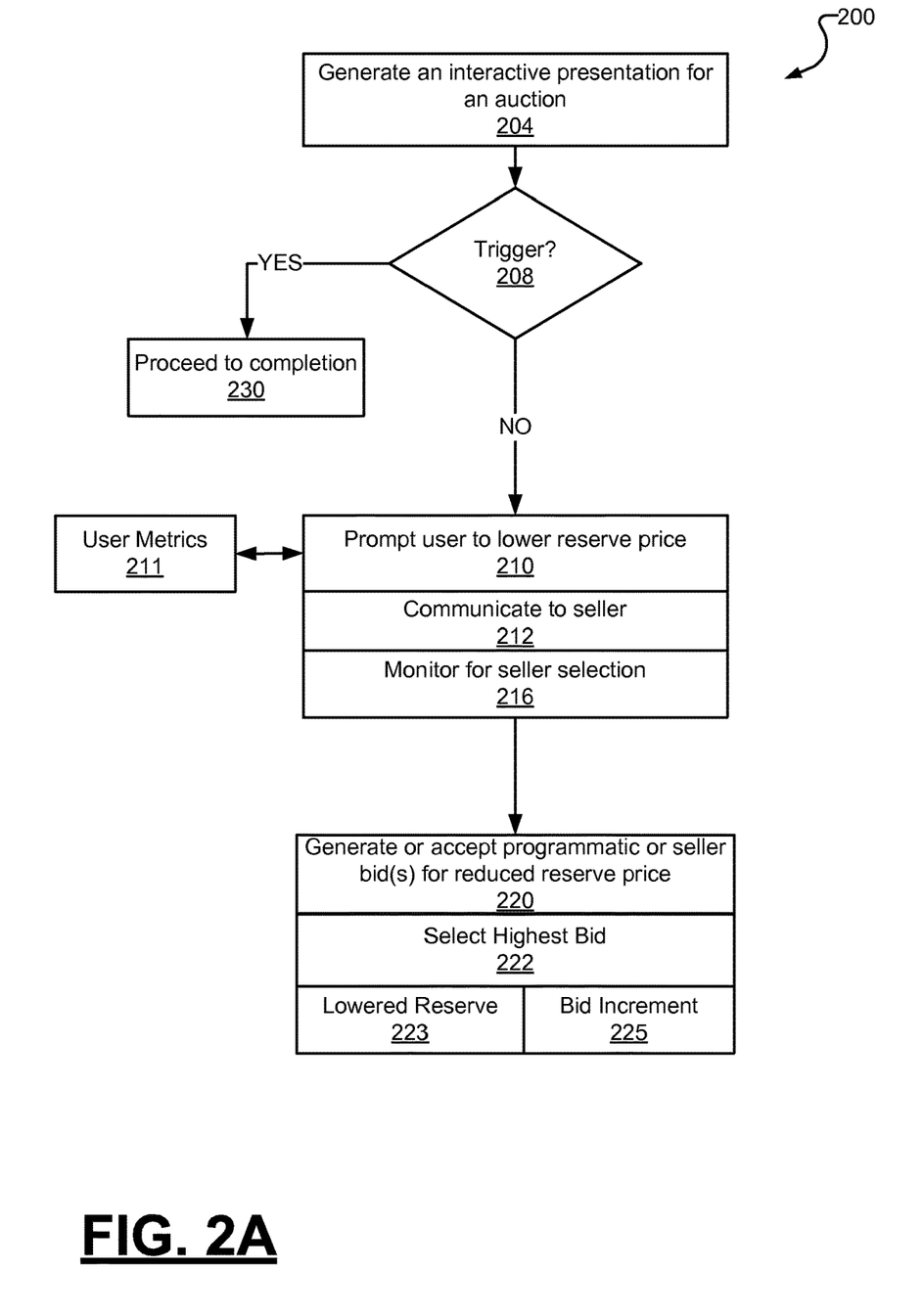
FIG. 2A is a flow chart illustrating a method for using automatic bidding to promote lower reserve pricing, according to an example.

FIG. 2A illustrates a method for implementing a sequence of lowering reserve pricing and initiating programmatic or seller bidding in order to promote bidding activity and auction closing, according to an embodiment. While operations of the method 200 are described below as being performed by specific components, modules or systems of the system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 2A, an online auction is conducted with a hidden reserve, through for example, a system 100 as described in FIG. 1 (204). The auction can be conducted by way of generating an interactive presentation (e.g., web page) on which auction data, containing records 141 of database 140, is provided and updated in real time. In particular, information to be updated in real time is based on the interactivity, seller activity, and/or auction host actions. For example, the online auction can be generated as a webpage that is displayed to prospective bidders as the user interface 110. Each auction can be associated with a current price (e.g., opening bid or highest bid), a bid increment, information about an item that is subject to the transaction, and other information such as bidding history, seller profile etc. The bid increment presents the minimum amount a new bidder must bid over the current top bid and is displayed for prospective bidders to see on the interactive presentation. In some implementations, a reserve price is also implemented for online auction. The reserve price 143, however, may be known only to the seller, so as to be kept hidden from bidders.

A programmatic determination is made as to whether a trigger exists for performing a tandem operation of reserve lowering and seller bidding is to be performed (208). The trigger can be predicated on the reserve price of the auction being at least two bid increments above the top bid. In one example, the determination is made as a continuous or repetitive process, while in some variations, additional auction conditions or processes, such as bidding activity (e.g., number bidders, number of page views, number of registered users, or number of bids received) trigger a reserve price check. If the reserve price for the auction has already been met, the auction proceeds to completion with the highest bidder being the auction winner (230).

Otherwise, operations can be implemented to facilitate the auction progressing to completion at above the reserve price. The operations include (i) prompting the user to lower the reserve price (210), and/or (ii) generating programmatic or seller bids (220). In one implementation, the reserve price analysis module 170 generates one or more reserve price suggestions 171. The reserve price suggestions 171 can be generated in response to, for example, a programmatic detection that the bidding activity has ceased or slowed. As an addition or variation, the reserve price suggestions 171 can be generated using qualitative or quantitative metrics such as bidding activity, historical information about the past transactions, and prior seller information. It will be appreciated that auctions with a greater amount of bidding activity are more likely to meet a higher reserve price than ones with very little activity. Furthermore, past transactions for the same item or similar (e.g., a house of the same size in the same neighborhood) are likely to fetch similar prices at auction when other factors are taken into consideration. Finally, a seller with more experience is more likely to be able to choose his or her own reserve price more accurate and thus the initial reserve price 143 should be given more weight in that case. The same user metrics (211) are also used to compute probabilities of the auction reaching each of the suggested reserve prices 171.

The suggested reserve prices can be communicated to the seller (212). For example, the reserve prices can be communicated to the seller as part of the dashboard 155. In one variation, the suggested reserve price 171 includes qualitative or quantitative information about one or more suggested reserve prices 171. For example, statistical analysis can indicate what reserve price is likely to be met, given certain information is present in an ongoing auction. In one example, the seller is notified on the seller dashboard 155, which displays the suggested reserve prices 171 and probabilities. In another embodiment, the seller notification module 162 also communicates with the seller via other mechanisms, such as e-mail, text message, or an application notification. Once notified, the system 100 may wait for seller selections (216). For example, the seller may choose one of the suggested reserve prices 171, choose a different reserve price on his or her own, or leave the reserve price as it is. In another example, the auction manager 130 enters a new reserve price for the auction automatically after a specified condition is met, which may be set in advance by the seller.

Once the reserve price is lowered, one embodiment provides for programmatic or seller bids (220). Some embodiments specifically select a programmatic bid which is selected to push a next genuine bid over the lowered reserve (222). The selected highest programmatic bid can be determined from the lowered reserve price (223) and the bid increment (225). For example, the selected bid can be equal to the lowered reserve price less one bid increment. If multiple bid increments exist between the highest bid and the selected value of the programmatic bids, multiple programmatic bids are generated by the designated increment until the selected bid is reached.

Accordingly, in one implementation, programmatic bidding component 160 determines whether and how many programmatic bids 151 to generate on behalf of the seller. This step may be done automatically, or in some examples, be directed by the seller (e.g., from the seller dashboard 155).

With further reference to FIG. 1, seller or programmatic bids 151 are generated by the programmatic bidding component 160 and sent to the auction manager 130. In one example, the programmatic bidding component 160 generates a new virtual personality account associated with the programmatic or seller bid 151 or uses a previously created virtual personality account. In this way, prospective bidders believe that the programmatic or seller bid 151 was placed by another bidder and not the seller or auction system 100. It will be appreciated that this identity obfuscation may be implemented in other ways that do not involve virtual accounts.

The programmatic or seller bids 151 can increase the top bid on the auction to an amount not greater than the reserve price. In one embodiment, the final programmatic or seller bid 151 raises the top bid to an amount no more than one bid increment 225 below the newly-selected reserve price (or the original reserve price 143 if the seller chose not to increase it). For example, if the bid increment is $5000, the current reserve price is $200,000, and the current bid price is $180,000, the reserve price analysis component 170 may suggest a lower reserve price of $190,000. In combination with the seller lowering the reserve price, the programmatic bidding component 160 generates a programmatic or seller bid 151 that increases the current bid price to $185,000. This creates a situation where the next bid from a prospective bidder meets the lowered reserve price and the auction will be successful.

Whether or not programmatic or seller bids 151 are created, the system 100 may still lower the reserve price on the auction either at the seller's selection or automatically. In one example, programmatic or seller bid 151 is selected such that it is two bid increments 225 below the reserve price 143, and the seller is prompted to reduce the reserve price by one bid increment 225. Similarly to above, this also creates a situation where the next bid from a prospective bidder meets the lowered reserve price and the auction will be successful.

Figure 2B:
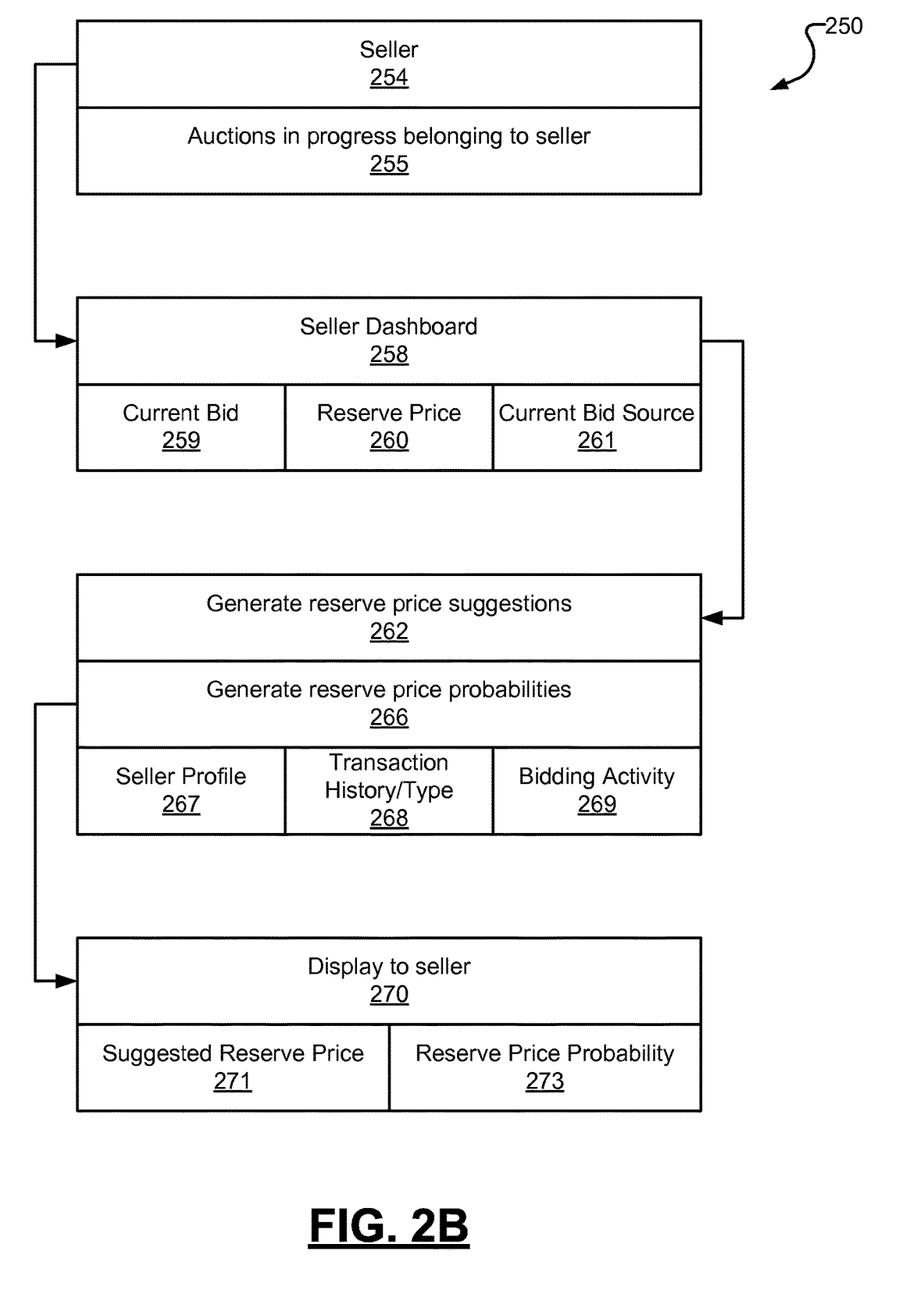
FIG. 2B is a flow chart illustrating a method of reserve price lowering on a seller dashboard, according to an example.

FIG. 2B illustrates a method of reserve price lowering on a seller dashboard, according to an embodiment. While operations of the method 250 are described below as being performed by specific components, modules or systems of the system 100, it can be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It can also be appreciated that some of the steps of this method may be performed in parallel or in a different order than illustrated.

With reference to an example of FIG. 2B, the dashboard component 144 interfaces with auction database 140 to retrieve database records 141 corresponding to a set of auctions in progress (255) that belong to the seller (254). These database records 141 include real-time information such as the current highest bid, reserve price, and an indicator as to the current bid source, which are all presented, among other things, to the seller on the seller dashboard 155 (258). The dashboard can include the current bid (259), reserve price (260) and/or current bid source (261). The current bid source can indicate to the seller whether the current bid price was placed by an actual bidder, or whether the current bid source is a seller or programmatic bid 151 placed by either the seller or the programmatic bidding component 160 on the seller's behalf. Through this indication, the seller can more efficiently determine whether adjusting the reserve price 143 or placing programmatic or seller bids 151 might be helpful in increasing the likelihood of a successful auction outcome for each of the seller's ongoing auctions. To further aid in this, in one example, the real-time auction information is color-coded to differentiate auctions that have reached their reserve price 143 from those that have not. In addition, the current bid source may be color-coded to indicate whether the current bid price was placed by an actual bidder or is a seller or programmatic bid 151. In a long list of ongoing auctions, this can allow the seller to more efficiently focus on auctions that may require attention to result in a successful sale.

In one embodiment, operations can be implemented to facilitate the auction progressing to completion at above the reserve price. The operations include (i) generating reserve price suggestions (262) and (ii) generating associated reserve price probabilities (266) for presentation to the seller on the seller dashboard 155. In one implementation, the reserve price analysis component 170 programmatically determines the reserve price suggestions and probabilities using statistical analysis on metrics calculated from a seller profile (267), transaction history for the item and type of item (268), and bidding activity (269).

Once calculated, one or more suggested reserve prices and associated reserve price probabilities of success can be displayed to the seller (270), for example on the seller dashboard 155. In one embodiment, the suggested reserve prices are displayed (271). As a variation, reserve price probabilities are displayed (273). The reserve price probabilities are color-coded for the seller's convenience. In addition, the seller dashboard 155 may provide functionality for the seller to select one of the suggested reserve prices 171 for each ongoing auction.

Dashboard Example

FIG. 3 illustrates an example presentation of a seller dashboard. The seller dashboard 300 can, for example, illustrate an implementation of the dashboard 155 (see FIG. 1) for displaying real-time information about a seller's auctions, including an asset identifier, current top bid, number of bids placed, auction end time, current reserve price 143 (see FIG. 1), and suggestions for lower reserve price with corresponding probabilities of success. The seller dashboard 300 can display the reserve state of various auctions for a given seller. If the state of the auction is that the reserve price is not met, then the dashboard displays a suggestion to lower the reserve price, or even the suggested lower prices, in the embodiment illustrated. A seller can optionally interact with the seller dashboard 300 to lower the reserve price.

In one example, the seller dashboard 300 color codes each asset that the seller has offered. The color coding is based on the state of the asset, specifically as it relates to the reserve price. A change in the asset price can also affect the state and the color coding.

In addition, the seller dashboard 300 includes functionality for sellers to create programmatic or seller bids 151 in order to promote their auctions and lower reserve prices. The size of these programmatic or seller bids 151 may be chosen by the seller, recommended by the programmatic bidding component 160 (see FIG. 1), or entered automatically at the seller's behest in some situations.

Furthermore, the seller dashboard 300 indicates whether the current top bid was placed by a real bidder or is a programmatic or seller bid 151. In some examples, the seller dashboard 300 also displays a list of previous bids and their statuses as real or promotional bids. This information may be used by the system 100 or the seller to decide whether to place more programmatic or seller bids 151 or lower the reserve price 143.

Auction Example

Figure 4:
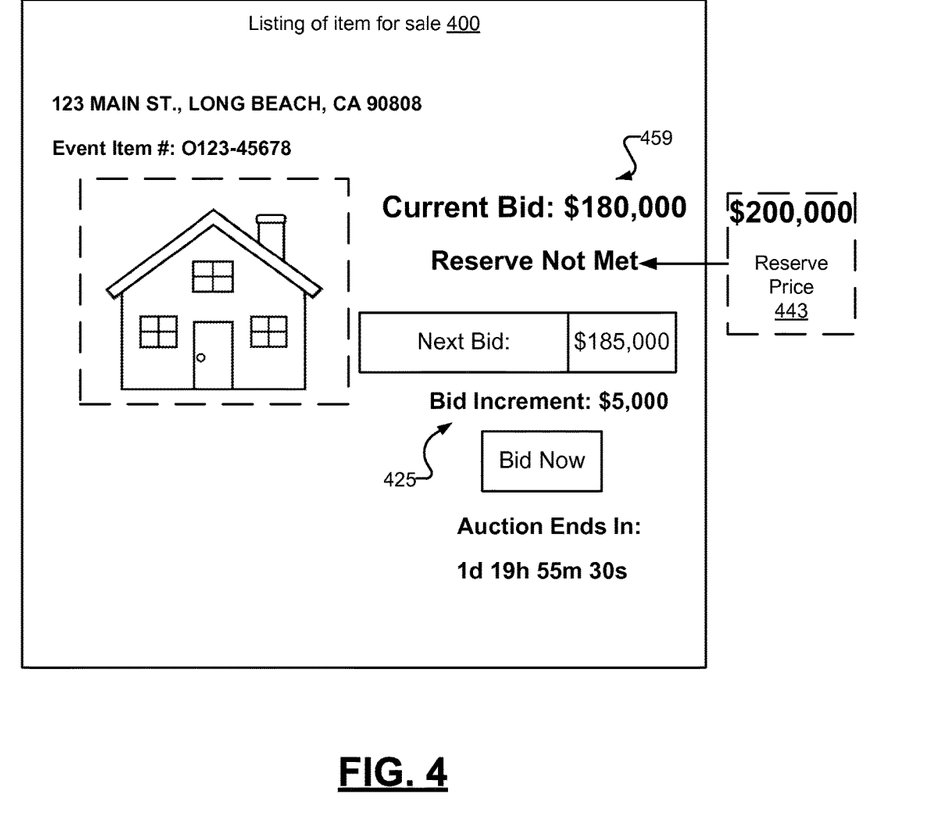
FIG. 4 illustrates a sample user interface presentation corresponding to an active auction.

FIG. 4 illustrates a sample user interface 400 corresponding to an active auction display of a listing of an item for sale 400. This user interface 110 may be implemented, for example, as a web page on the Internet, an application for a personal computer, or an application on a mobile or tablet device. In describing a user interface 400, reference may be made to elements of system 100 for purpose of illustrating suitable components for implementing and utilizing the user-interface. The user-interface 400 provides an example of user interface 110, for a system such as shown with FIG. 1.

In one embodiment, when a user requests to view an item, transaction logic 120 interfaces with the auction database 140 through auction manager 130 in order to retrieve relevant details about the auction to display to the user. For example, the system 100 displays information describing the auction such as a picture, location, and item identification number as can be seen on FIG. 4. Furthermore, the system 100 displays real-time information about the state of the auction, including a timer for when the auction ends in one example. The current bid 459 indicates the highest price that has been currently bid, and users who are not the seller of the item will not know whether this bid was placed by another buyer or is a programmatic or seller bid 151. In addition, bidders and prospective bidders will not see the reserve price 443 displayed on the user interface 400. In some implementations, they may see an indication of whether or not the hidden reserve price 443 has been met or not. The bidders can place a next bid that is the current bid 459 plus the bid increment. With reference to FIG. 1, this bidding is handled by the bidder interface component 112 and transmitted to the auction manager 130 by transaction logic 120.

In one implementation, the seller can lower the reserve price through interaction with the user interface 400. The bidders will not know the seller lowered the reserve price 443. Still further, in one implementation, once the reserve price is lowered, a programmatic or seller bid is generated that increases the current bid 459, provided that the new value of the current bid does not exceed the reserve bid 443. This tandem action can occur to increase the chance that the reserve price is met.

Computer System

Figure 5:
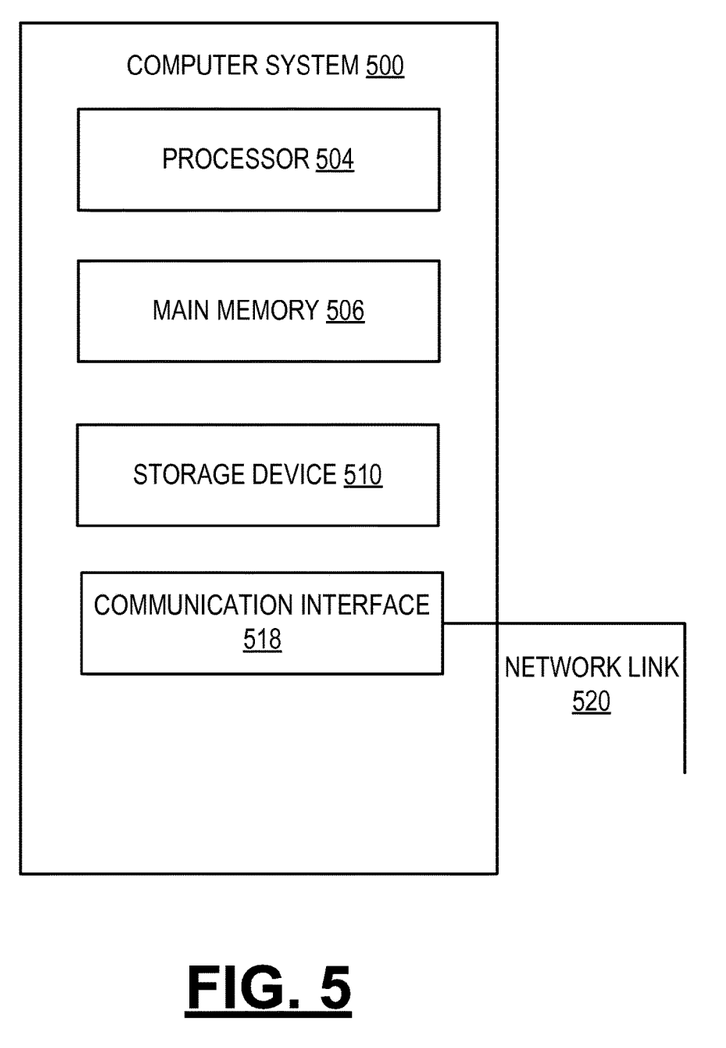
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, system 100 may be implemented using one or more servers such as described by FIG. 5.

In an embodiment, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Embodiments described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for providing a dashboard user interface for managing online auctions, the method being implemented by a network system and comprising:
   determining, for each online auction of a plurality of online auctions, one or more reserve price suggestions based on at least one qualitative or quantitative metric and a corresponding set of reserve price probabilities that indicate a likelihood of that online auction reaching each of the one or more reserve price suggestions, wherein each of the plurality of online auctions is managed by a seller, and wherein each of the plurality of online auctions has a corresponding auction state;
   presenting, by a computing device of the seller, a dynamically updated dashboard user interface for managing the plurality of online auctions, wherein the dashboard user interface displays, for each of the plurality of online auctions, a corresponding reserve price, the one or more reserve price suggestions, and the corresponding set of reserve price probabilities;
   determining, by the computing device of the seller, one or more updated reserve price suggestions and a corresponding set of updated reserve price probabilities for a first online auction of the plurality of online auctions listed in the dashboard user interface in response to detecting a change in at least one of the qualitative or quantitative metrics for the first online auction after a bid is received for the first online auction, wherein the at least one of the qualitative or quantitative metrics includes a determination that the first online auction is within a period of time remaining until the end of the first online auction;

updating, by the computing device of the seller, the dashboard user interface to include the one or more updated reserve price suggestions and the corresponding set of updated reserve price probabilities for the first online auction;

color coding, by the computing device of the seller, the one or more updated reserve price probabilities on the dashboard user interface corresponding to the one or more updated reserve price suggestions for the first online auction; and presenting, by the computing device of the seller and via the dashboard user interface, the plurality of online auctions including the color-coded one or more updated reserve price probabilities for the first online auction and one or more user interface features to enable the seller to select one of the one or more updated reserve price suggestions as the reserve price of the first online auction.

2. The method of claim 1, further comprising:
indicating, on the dashboard user interface, (i) each online auction for which a current price exceeds the reserve price, and (ii) each online auction for which the current price is less than the reserve price.

3. The method of claim 1, wherein the dashboard user interface allows the seller to generate a new bid and conceal a source of the new bid from prospective bidders.

4. The method of claim 1, wherein the one or more reserve price suggestions for each online auction of the plurality of online auctions are determined based on at least one of a transaction history for an item being auctioned, a transaction history for a type of item being auctioned, a bidding activity of the online auction, or a scheduled event and the at least one of a profile information about the seller, a transaction history for the item being auctioned, and a transaction history for the type of item being auctioned.

5. The method of claim 4, wherein the bidding activity of each online auction corresponds to a number of bidders, a number of views, or a number of registrations.

6. A computer system comprising:
one or more processors;
a memory resource storing a set of instructions that, when executed by the one or more processors, cause the computer system to:
determine, for each online auction of a plurality of online auctions, one or more reserve price suggestions based on at least one qualitative or quantitative metric and a corresponding set of reserve price probabilities that indicate a likelihood of that online auction reaching each of the one or more reserve price suggestions, wherein each of the plurality of online auctions is managed by a seller, and wherein each of the plurality of online auctions has a corresponding auction state;
present a dynamically-updated dashboard user interface for managing the plurality of online auctions, wherein the dashboard user interface displays, for each of the plurality of online auctions, a corresponding reserve price, the one or more reserve price suggestions, and the corresponding set of reserve price probabilities;
determine one or more updated reserve price suggestions and a corresponding set of updated reserve price probabilities for a first online auction of the plurality of online auctions listed in the dashboard user interface in response to detecting a change in at least one of the qualitative or quantitative metrics for the first online auction after a bid is received for the first online auction, wherein the at least one of the qualitative or quantitative metrics includes a determination that the first online auction is within a period of time remaining until the end of the first online auction;
update the dashboard user interface to include the one or more updated reserve price suggestions and the corresponding set of updated reserve price probabilities for the first online auction;
color code the one or more reserve price suggestions on the user interface for the first online auction; and
present, via the dashboard user interface, the plurality of online auctions including the color-coded one or more updated reserve price probabilities for the first online auction and more user interface features to enable the seller to select one of the one or more updated reserve price suggestions as the reserve price of the first online auction.

7. The computer system of claim 6, wherein the dashboard user interface allows the seller to generate a new bid and conceal a source of the new bid from a prospective buyer.

8. The computer system of claim 6, wherein the one or more reserve price suggestions for each online auction of the plurality of online auctions are determined based on at least one of a transaction history for an item being auctioned, a transaction history for a type of item being auctioned, a bidding activity of the online auction, or a scheduled event and the at least one of a profile information about the seller, a transaction history for the item being auctioned, and a transaction history for the type of item being auctioned.

9. The computer system of claim 8, wherein the bidding activity of each online auction corresponds to a number of bidders, a number of views, or a number of registrations.

10. A non-transitory machine-readable media containing instructions that, when executed by one or more processors of a network system, cause the network system to:
determine, for each online auction of a plurality of online auctions, one or more reserve price suggestions based on at least one qualitative or quantitative metric and a corresponding set of reserve price probabilities that indicate a likelihood of that online auction reaching each of the one or more reserve price suggestions, wherein each of the plurality of online auctions is managed by a seller, and wherein each of the plurality of online auctions has a corresponding auction state;
present a dynamically-updated dashboard user interface for managing the plurality of online auctions, wherein the dashboard user interface displays, for each of the plurality of online auctions, a corresponding reserve price, the one or more reserve price suggestions, and the corresponding set of reserve price probabilities;
determine one or more updated reserve price suggestions and a corresponding set of updated reserve price probabilities for a first online auction of the plurality of online auctions listed in the dashboard user interface in response to detecting a change in at least one of the qualitative or quantitative metrics for the first online auction after a bid is received for the first online auction, wherein the at least one of the qualitative or quantitative metrics includes a determination that the first online auction is within a period of time remaining until the end of the first online auction;

update the dashboard user interface to include the one or more updated reserve price suggestions and the corresponding set of updated reserve price probabilities for the first online auction;

color code the one or more reserve price suggestions on the user interface for the first online auction; and present, via the dashboard user interface, the plurality of online auctions including the color-coded one or more updated reserve price probabilities for the first online auction and one or more user interface features to enable the seller to select one of the one or more updated reserve price suggestions as the reserve price of the first online auction.

11. The method of claim 1, further comprising providing, on the dashboard user interface, at least one corresponding condition for reducing the reserve price of the first online auction, wherein the at least one corresponding condition includes a number of bidders, number of page views, number of registered users, or number of bids received.

12. The computer system of claim 6, further comprising providing, on the dashboard user interface, at least one corresponding condition for reducing the reserve price of the first online auction, wherein the at least one corresponding condition includes a number of bidders, number of page views, number of registered users, or number of bids received.

* * * * *